(12) United States Patent
Brendel

(10) Patent No.: US 6,182,139 B1
(45) Date of Patent: *Jan. 30, 2001

(54) CLIENT-SIDE RESOURCE-BASED LOAD-BALANCING WITH DELAYED-RESOURCE-BINDING USING TCP STATE MIGRATION TO WWW SERVER FARM

(75) Inventor: Juergen Brendel, Santa Clara, CA (US)

(73) Assignee: Resonate Inc., Mountain View, CA (US)

( * ) Notice: Under 35 U.S.C. 154(b), the term of this patent shall be extended for 0 days.

This patent is subject to a terminal disclaimer.

(21) Appl. No.: 09/103,336

(22) Filed: Jun. 23, 1998

Related U.S. Application Data

(63) Continuation-in-part of application No. 08/691,006, filed on Aug. 5, 1996, now Pat. No. 5,774,660.

(51) Int. Cl.[7] .............................. G06F 13/38; G06F 15/17
(52) U.S. Cl. .......................... 709/226; 709/105; 709/201
(58) Field of Search ................................. 709/226, 229, 709/238, 239, 245, 250, 302, 304, 219, 203, 105, 104; 370/237, 390; 714/11, 13, 5, 6, 7

(56) References Cited

U.S. PATENT DOCUMENTS

| 5,181,200 | 1/1993 | Harrison | 370/85.1 |
| 5,325,362 | 6/1994 | Aziz | 370/94.1 |

(List continued on next page.)

FOREIGN PATENT DOCUMENTS

| 648038 | * | 4/1995 | (EP) | H04L/29/06 |
| 677943 | * | 10/1995 | (EP) | H04L/29/06 |

*Primary Examiner*—Mark H. Rinehart
*Assistant Examiner*—Bunjob Jaroenchonwanit
(74) *Attorney, Agent, or Firm*—Stuart T. Auvinen

(57) ABSTRACT

A client-side dispatcher resides on a client machine below high-level client applications and TCP/IP layers. The client-side dispatcher performs TCP state migration to relocate the client-server TCP connection to a new server by storing packets locally and later altering them before transmission. The client-side dispatcher operates in several modes. In an error-recovery mode, when a server fails, error packets from the server are intercepted by the client-side dispatcher. Stored connection packet's destination addresses are changed to an address of a relocated server. The altered packets then establish a connection with the relocated server. Source addresses of packets from the server are changed to that of the original server that crashed so that the client application is not aware of the error. In a delayed URL-based dispatch mode, the client-side dispatcher intercepts connection packets before they are sent over the network. Reply packets are faked by the client-side dispatcher to appear to be from a server and then sent to up to the client TCP/IP layers. The client's TCP then sends URL packet identifying the resource requested. The client-side dispatcher decodes the URL and picks a server and sends the packet to the server. Reply packets from the server are intercepted, and data packets altered to have the source address of the faked server. Multicast of the initial packet to multiple servers is used for empirical load-balancing by the client. The first server to respond is chosen while the others are reset. Thus the client-side dispatcher picks the fastest of several servers.

20 Claims, 9 Drawing Sheets

U.S. PATENT DOCUMENTS

| | | | |
|---|---|---|---|
| 5,473,599 | 12/1995 | Li et al. | 370/16 |
| 5,537,542 | 7/1996 | Eilert et al. | 395/184.01 |
| 5,603,029 * | 2/1997 | Aman et al. | 395/675 |
| 5,621,734 | 4/1997 | Mann et al. | 370/94.1 |
| 5,636,371 * | 6/1997 | Yu et al. | 395/500 |
| 5,673,322 | 9/1997 | Pepe et al. | 380/49 |
| 5,701,451 | 12/1997 | Rogers et al. | 395/600 |
| 5,706,507 | 1/1998 | Schloss | 395/615 |
| 5,710,918 | 1/1998 | Lagarde et al. | 395/610 |
| 5,715,453 | 2/1998 | Stewart | 395/615 |
| 5,717,860 | 2/1998 | Graber et al. | 395/200.16 |
| 5,721,908 | 2/1998 | Largarde et al. | 395/610 |
| 5,751,971 * | 5/1998 | Dobbins et al. | 709/238 |
| 5,774,660 * | 6/1998 | Brendel et al. | 709/201 |
| 5,774,668 * | 6/1998 | Choquier et al. | 709/223 |
| 5,826,032 * | 10/1998 | Finn et al. | 709/236 |
| 5,862,335 * | 1/1999 | Welch, Jr. et al. | 709/224 |
| 5,862,362 * | 1/1999 | Somasegar et al. | 395/500 |
| 5,892,924 * | 4/1999 | Lyon et al. | 709/245 |
| 5,894,554 * | 4/1999 | Lowery et al. | 709/203 |
| 5,926,482 * | 7/1999 | Christie et al. | 370/469 |

* cited by examiner

CLIENT-SIDE RESOURCE-BASED LOAD-BALANCING WITH DELAYED-RESOURCE-BINDING USING TCP STATE MIGRATION TO WWW SERVER FARM

RELATED APPLICATION

This application is a continuation-in-part of the co-pending parent application for "A World-Wide-Web Server with Delayed Resource-Binding for Resource-Based Load Balancing on a Distributed-Resource Multi-Node Network", U.S. Ser. No. 08/691,006, filed Aug. 5, 1996, now U.S. Pat. No. 5,774,660.

FIELD OF THE INVENTION

This invention relates to network servers, and more particularly to URL-based server-assignment on the client-side.

BACKGROUND OF THE INVENTION

Many Internet users can testify to the utter frustration when a "SERVER NOT RESPONDING" error message is displayed on their browser while trying to connect to a web site. Users often blame the company that administers the unavailable web site, despite large investments in replicated servers. Internet technologies are increasingly used for mission-critical Intranet applications that require high levels of reliability. An intelligently-designed web-site architecture with better fault-tolerance is needed.

The parent application described a server farm that uses a single, virtual IP address for all server machines. The client first connects to a load-balancer at the server farm that receives all incoming packets to the virtual IP address. The load-balancer makes the initial connection with the client, saving the packets used to make the connection. Once the connection is made and acknowledged, the client sends the data request in a packet that contains a Universal Resource Locator, or URL.

The load-balancer extracts the URL from the packet. The URL specifies a file or service at the web-server farm. The load-balancer then selects only those servers that have the resource requested in the URL. Load-balancing is then performed among these servers.

Since load-balancing waits until the URL is received, load-balancing depends on the resource requested, not merely on the load of each server. The server farm can be heterogeneous—the entire content of the web site does not have to be mirrored to each server's hard disk. Some files and resources may be located on a single node or a few nodes. Other web sites resources may include dedicated servers with specific resources such as databases or built-in application-programming interfaces (API's) to interface with user-defined programs, or software licenses to run particular programs on particular servers. Other servers may support the SMTP or POP3 post-office-protocols for e-mail, the NNTP protocol for newsgroups, etc. These specialized resources can reside on just a few of the servers.

TCP State Migration

The connection is transferred from the load-balancer to the assigned server once the URL is extracted. In this process, called TCP state migration, the stored packets from the client are replayed by the load-balancer to the assigned server. The acknowledgement packets from the assigned server are captured by the load-balancer and deleted so that the client is unaware that the connection has been transferred from the load-balancer to the assigned server. Future packets from the client are first routed to the load-balancer, and then passed through to the assigned server. The assigned server uses the virtual IP address instead of its own IP address as the source address for packets returned to the client.

TCP state migration is described in much more detail in the parent, U.S. Pat. No. 5,774,660, hereby incorporated by reference.

Fault-Tolerant Web Site—FIG. 1

The parent application described a fault-tolerant web farm using a back-up load balancer. FIG. 1 is a diagram of a fault-tolerant web site with a back-up load balancer and dual Internet connections. Browser client 10 sends requests through Internet 66 with a virtual IP address for the whole web site. Incoming packets with the virtual IP address are routed to load balancer 70 over local LAN 144. Local LAN 144 may contain routers, switches, and hubs (not shown) when servers are located on separate network nodes. Most large server farms have very complex interconnections within the local LAN network. Local LAN 144 connects to Internet 66 through Internet connection 142 which directly connects to Internet connection router 140, and through Internet connection 148, which is connected to Internet connection router 146.

Connections 142, 148 provide connection to Internet 66. A primary load balancer 70 is used to direct and load balance connections across servers 51, 52, 55, 56. A backup load balancer 70' is also provided to take over operation should primary load balancer 70 fail. These load balancers are located on separate servers to lessen the chance that both fail at the same time. Backup load balancer 70' closely monitors primary load balancer 70 to detect a failure.

It is somewhat undesirable to have a back-up load balancer. If the primary and back-up load-balancers crash or otherwise becomes unavailable, client packets are no longer forwarded to their servers, causing the clients to hang. A technique to avoid this client hang caused by a load-balancer crash is desired.

Incoming Packets Through Load-Balancer

FIG. 1 shows that incoming packets from client 10 are all routed through load-balancer 70, since a virtual IP address is used as the destination address. Load-balancer 70 changes the address of these incoming packets to direct them to the assigned server, such as server 52. Server 52 then sends the data back to client 10, using the virtual IP address as the source.

Although server 52 sends outgoing packets directly to client 10, the incoming packets still all go through load-balancer 70. This still creates somewhat of a network bottleneck, although certainly not as severe as the prior art since only the smaller incoming packets are routed through load-balancer 70. It is desirable to remove this bottleneck.

FIG. 2 shows a client attempting to connect to a failed server. Similar reference numbers are used as described for FIG. 1. Client 10 attempts to open a connection to load-balancer 70, which is migrated over to server 52. Packets from client 10 are not responded to by server 52 since server 52 has crashed. Client 10 receives no reply from server 52, so client 10 eventually displays an error message to the user such as "Server Not Responding". Otherwise, the client times out while waiting for a response, and displays the error message "Server Down or Unreachable", or "Connection Timed Out".

Another common error is that the client uses a stale reference—a URL to a web page that no longer exists or has been relocated. It is desirable to have URL automatically translated to the relocated web page to avoid this error.

It is desired to reduce the frequency of "SERVER NOT RESPONDING" and "SERVER TIMED OUT" messages that Internet users often receive. A more efficient and fault-tolerant web-site architecture that avoids the data bottleneck and single point of failure at the load-balancer at the web site is desired. It is desired for the client to perform load-balancing or server assignment and for the TCP connection to be migrated from the client to the assigned server. Client-side server-assignment is desirable.

WAN load balancing is also desirable. To minimize client latency the client should be served by the best responding server. Responding is a function of both server load and network latency. Minimizing latency is desirable since minimal-latency paths tend to go around Internet bottlenecks, because server routes though bottlenecks are slower. This improves the overall performance of the Internet and/or company WAN links.

SUMMARY OF THE INVENTION

A client-side dispatcher migrates a connection for a high-level client application from an original server to a relocated server. The client-side dispatcher has a session table for storing an original server address of the original server and a relocated server address of the relocated server. An input receives first packets from the high-level client application. The first packets have the original server address as a destination address. An output outputs to a network second packets. The second packets have the relocated server address as the destination address.

A local packet storage is for storing the first packets. An address translator converts the destination address of the first packets from the original server address to the relocated server address to generate the second packets. A packet replayer sends the second packets to the output.

A first state machine tracks a sequence of the first packets from the high-level client application. A second state machine tracks a sequence of the second packets to the network. A checksum generator re-generates a checksum for the second packets containing the relocated server address.

A sequence-number generator adjusts a sequence number of incoming packets from the relocated server to match sequence numbers from the original server. It also adjusts an acknowledgement sequence number of outgoing packets to the relocated server to match sequence numbers for the relocated server. Thus packets to the original server are altered for transmission to the relocated server.

In further aspects the input is connected to an Internet-Protocol IP layer. The IP layer is connected to a transfer-control-protocol TCP layer that is connected to the high-level client application. The output is connected to a data-link layer that is connected to the network.

In still further aspects the session table has a plurality of entries. Each entry is selected by a first index and by a second index. The first index has the original server address while the second index has the relocated server address. The first index is extracted from outgoing first packets while the second index is extracted from incoming packets from the relocated server.

In further aspects the sequence numbers of incoming packets from the relocated server are adjusted by subtracting a delta value while the acknowledgement sequence numbers for outgoing packets to the relocated server are adjusted by adding the delta value. The delta value is generated by subtracting a sequence number from a first packet received from the relocated server from a sequence number from a first packet received from the original server.

In other aspects an error detector detects an error from the original server. The error detector sends a reset packet to the original server to close a connection. The error detector activates the address translator to translate the first packets stored in the local packet storage into the second packets. The packet replayer sends the second packets to the relocated server to make a new connection with the relocated server instead of with the original server. Thus the connection is migrated from the original server to the relocated server when an error occurs. The error detector detects the error when the original server does not respond or when incoming data indicates an error.

DETAILED DESCRIPTION

Figure 1:
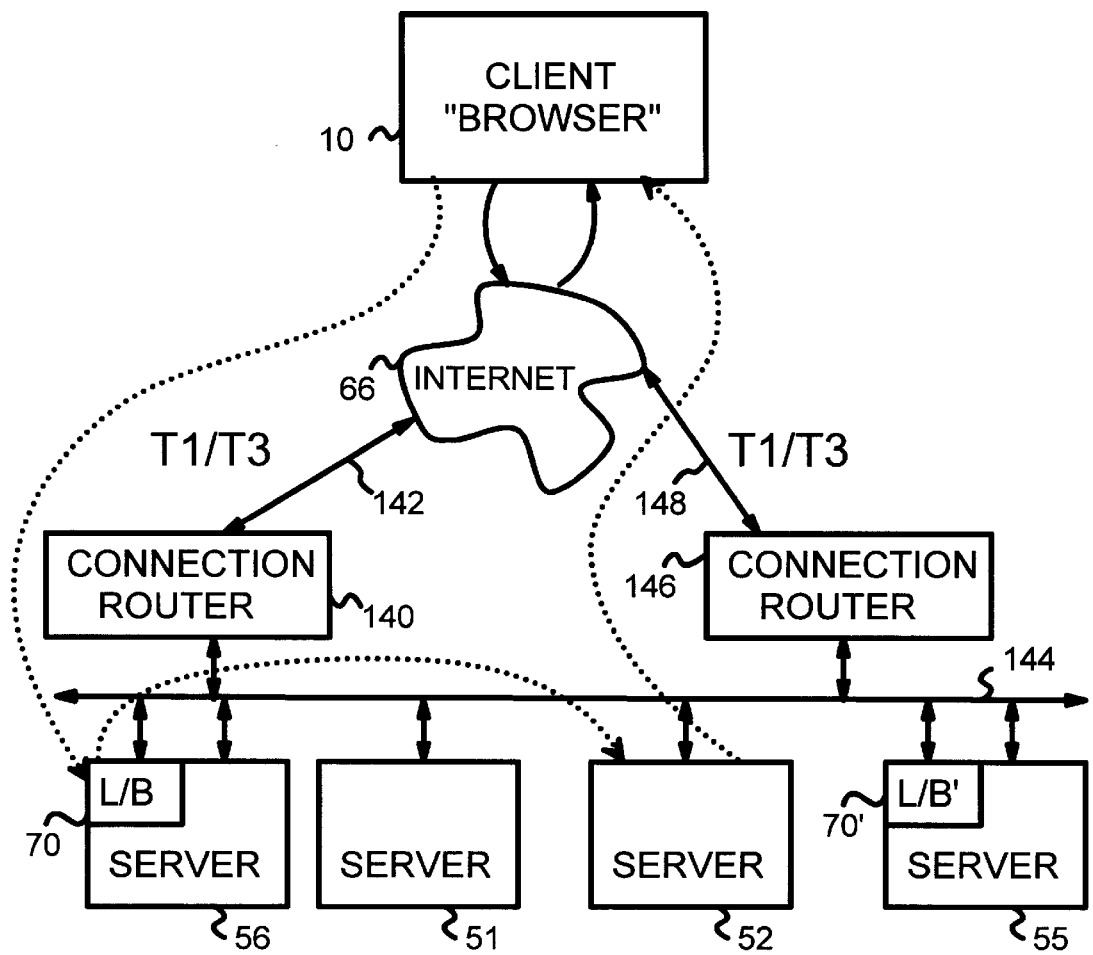
FIG. 1 is a diagram of a fault-tolerant web site with a back-up load balancer and dual Internet connections.
Figure 2:
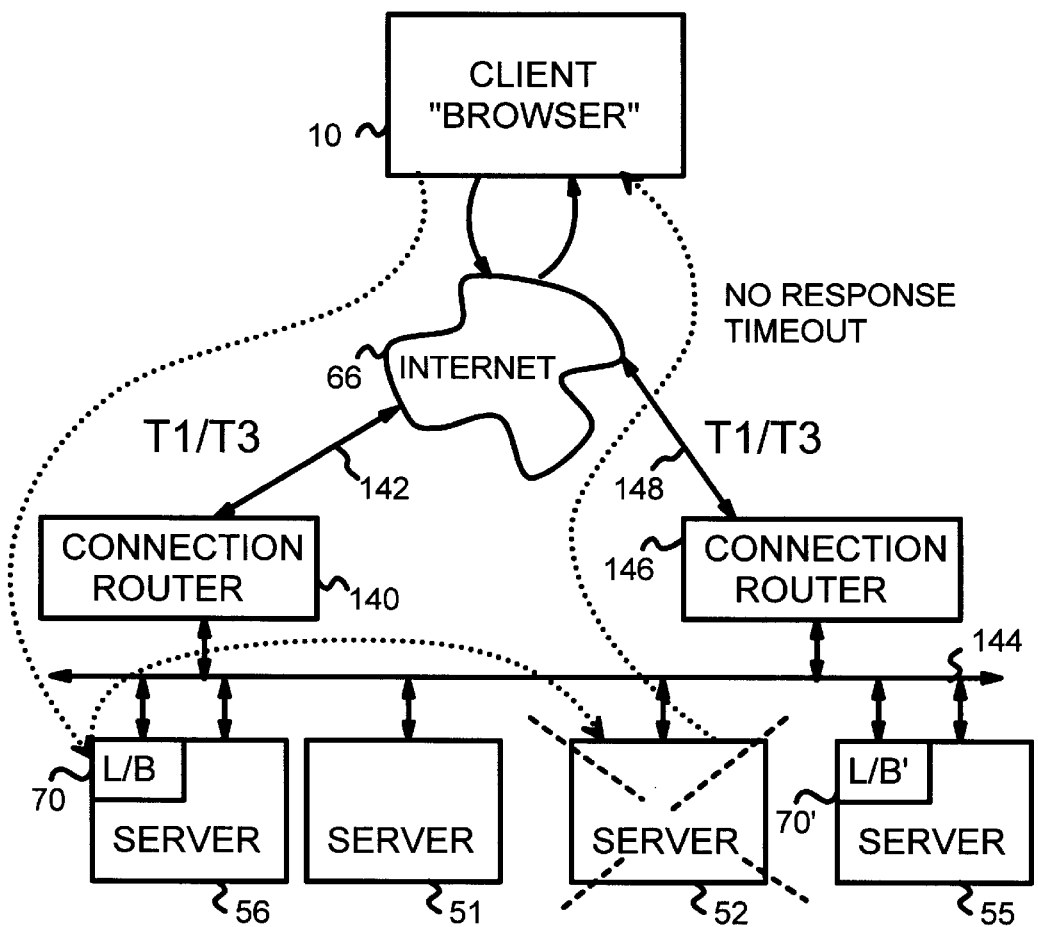
FIG. 2 shows a client stranded on a failed server.

The present invention relates to an improvement in Internet request dispatching from clients to servers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that the TCP state migration method described in the parent application can be used not just within the web-site farm, but can extend back to the client. The connection is transferred or "hops", not just within the server farm, but across the Internet from server to server, controlled by the client. While the parent describes TCP migration of the connection from the load balancer to the assigned server, the inventor has realized that the client can also perform TCP migration.

Client-Side Load Balancer Intercepts Connection Packets

The functions of the load balancer can be moved below the client's network stack. Then the connection can be initially made within the client machine, with all connection-establishment packets intercepted without being sent out over the network. A load-balancer module in the client machine fakes a connection with the standard TCP/IP stack that is used by the higher-level client application (browser). Once the browser's stack makes the faked connection, the browser sends out the URL with the requested resource. The client load-balancer can then extract the URL and make a server assignment. The client load-balancer then replays the connection-establishment packets to the assigned server by transmitting them over the Internet.

The client-side load balancer resides in the client machine's network stack—invisible to the client applications. It appears to the client application that a connection is made with a remote server. Once the URL is sent from the client application, the client-side load-balancer assigns a remote server and migrates the connection over the Internet to the remote server. The client application or browser is not aware that the connection was migrated from the local machine to a remote node. Thus client-side load balancing is transparent to high-level user applications.

The client-side load balancer can operate in other modes. For example, a normal connection with a remote server can be made. If a server-error message is received, the client-side load-balancer intercepts the error messages, hiding them from the client user application. A new connection to a replacement server is made by the client-side load-balancer by replaying the connection packets. Once the new connection is made, the client can continue to make requests, unaware that the connection has been transferred to another server. Thus server errors are hidden from the user.

Of course, the client-side load balancer cannot perform traditional load balancing without knowledge of the loads of each server at the server farm, or knowledge of requests from other clients. Thus the inventor prefers the term "client-side dispatcher" since client requests are dispatched to various servers.

Load-Balancing By MultiCast of Connection Packets

A simple type of load-balancing is possible from the client side. Rather than just make one connection with one server, the client-side dispatcher sends out many connection packets to different servers. The server that responds first is likely to be the least loaded, or the closest server to the client on the network. The connection is acknowledged with this first-responding server while connections to the slower servers are cancelled by sending them reset packets.

While the load-balancing capabilities of the client-side dispatcher are perhaps less powerful than for the server-side load balancer, error handling is better performed on the client side. Thus the client-side dispatcher has error-handling capabilities that are superior to those of the server farm's load balancer. The usefulness of the client-side dispatcher thus extends beyond traditional load-balancing.

Figure 3:
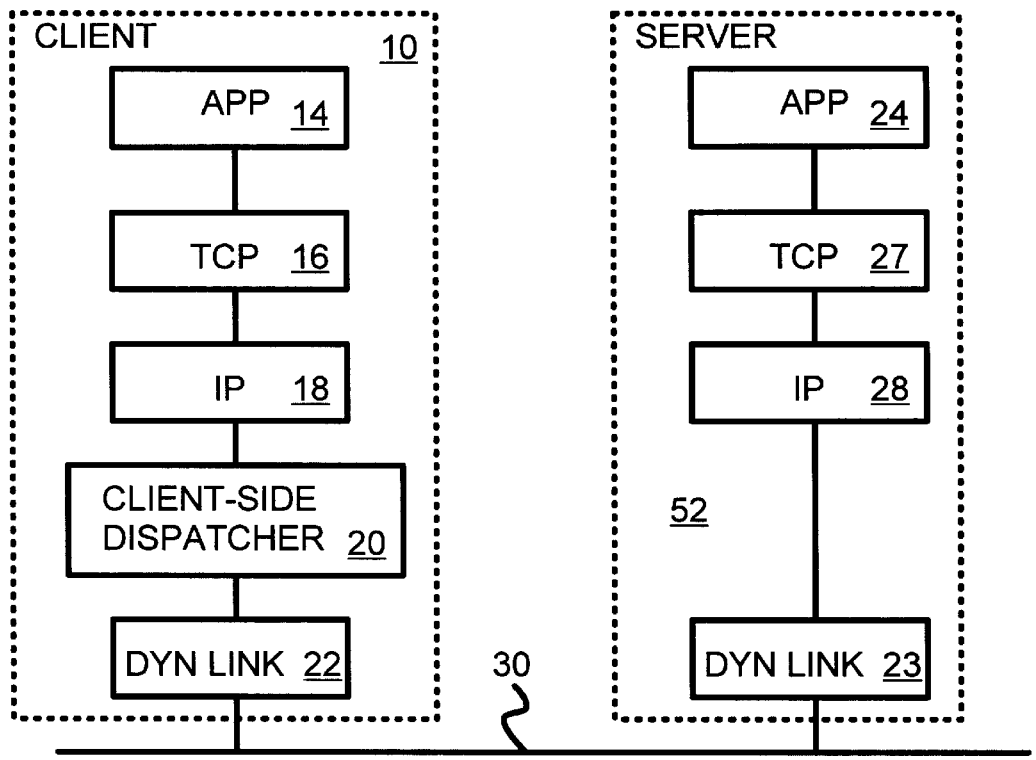
FIG. 3 shows a client-side dispatcher in the client machine that assigns a server to the client.

Client-Side Dispatcher In Client's Network Stack—FIG. 3

FIG. 3 shows a client-side dispatcher in the client machine that assigns a server to the client. Client 10 includes one or more high-level user applications 14. High-level user applications 14 send information over network 30 by sending information down a network stack. TCP layer 16 receives network requests from high-level user applications 14 and forms TCP packets. TCP headers, containing sequence and acknowledgement numbers, ports for the source (client application) and destination (server application) and a TCP checksum are generated and prepended to the packet.

IP layer 18 receives the TCP packets from TCP layer 16 and generates Internet Protocol (IP) addresses for the client machine and the server machine. An IP header, containing the addresses and an IP checksum is generated and prepended. The TCP packet with the user-application data is contained within the IP packet.

Several operating systems (Windows NT, Solaris, AIX, HPUX, and others) allow for third-party software modules to be placed within the network stack. The exact location within the stack can vary, but the modules can intercept and alter network packets without being visible to high-level user applications 14. In FIG. 3, client-side dispatcher 20 is such a third-party software module that is placed below IP layer 18. Client-side dispatcher 20 intercepts IP packets from IP layer 18 before they are sent to data-link layer (DLL) 22. DLL 22 contains the low-level network-card software drivers, such as an Ethernet driver. DLL 22 writes and reads registers on a network card to send packets over the physical media of network 30.

Assigned server 52 also connects to network 30 using data-link layer DLL 23. Packets are passed up the server's network stack to IP layer 28 and TCP layer 27 before the data is sent to server application 24. Server application 24 responds to the high-level request from high-level client application 14 by fetching the desired data and transmitting it back over network 30 to client 10.

In this mode, client-side dispatcher 20 intercepts IP packets and changes the virtual IP address of the server farm to the physical IP address of assigned server 52. Since the physical IP address is used for outgoing packets, these packets are sent directly to assigned server 52. These packets are not sent first to the server-side load balancer (70 of FIG. 1). Thus load-balancing functions are shifted to the client machine using client-side dispatcher 20.

Figure 4:
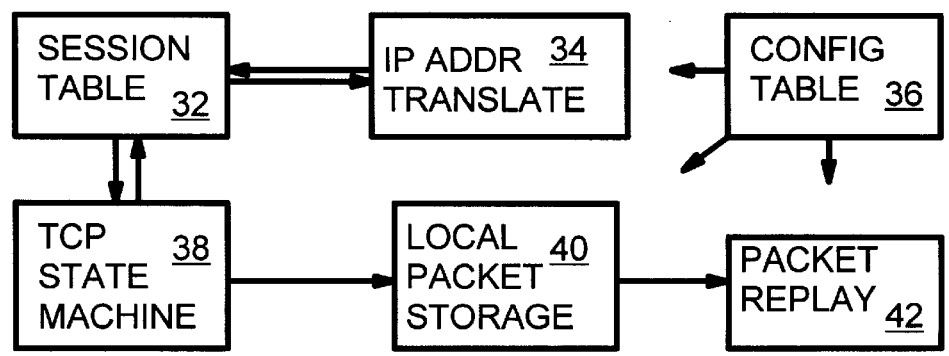
FIG. 4 is a diagram of a client-side dispatcher module.

Client-Side Dispatcher—FIG. 4

FIG. 4 is a diagram of a client-side dispatcher module. Client-side dispatcher 20 fits in the client machine's network stack as shown for FIG. 3. Session table 32 contains entries for TCP sessions with remote clients, including sessions migrated to a another server, and sessions that have not yet been migrated to the remote server. Session table 20 is described in more detail in FIGS. 9-10.

Address translation table 32 contains IP addresses and TCP ports of relocated servers that are linked to IP addresses and ports of requested servers. Relocated servers are the client's TCP connection endpoints that have been moved to a new server process or machine.

Address translation table 34 converts the IP address and port of a requested server to an IP address and TCP port of a relocated server. This translation is then stored in session table 32 for currently-active sessions. Address translation table 34 contains translations for active sessions, and translations for other addresses not currently active in a session.

TCP state machine 38 keeps track of the TCP state as synchronization SYN, acknowledgement ACK, data, and reset RST packets are exchanged. Since multiple client applications can open multiple sessions with different servers, TCP states for each active session are stored in session table 32.

Rather than simply pass each packet through, client-side dispatcher 20 may store packets in local packet storage 40. Both incoming and outgoing packets may be stored. Packet replayer 42 re-transmits packets from storage 40 to relocated servers as connections are transferred. Incoming error packets may be intercepted by client-side dispatcher 20 and stored in storage 40 rather than sent up to the client application while the connection is being migrated from a failed server. Outgoing packets for establishing a connection can be stored rather than sent out over the network until the first data-request packet is received, so the client-side dispatcher 20 can decode the URL request before deciding which server to assign the request to.

Figure 5:
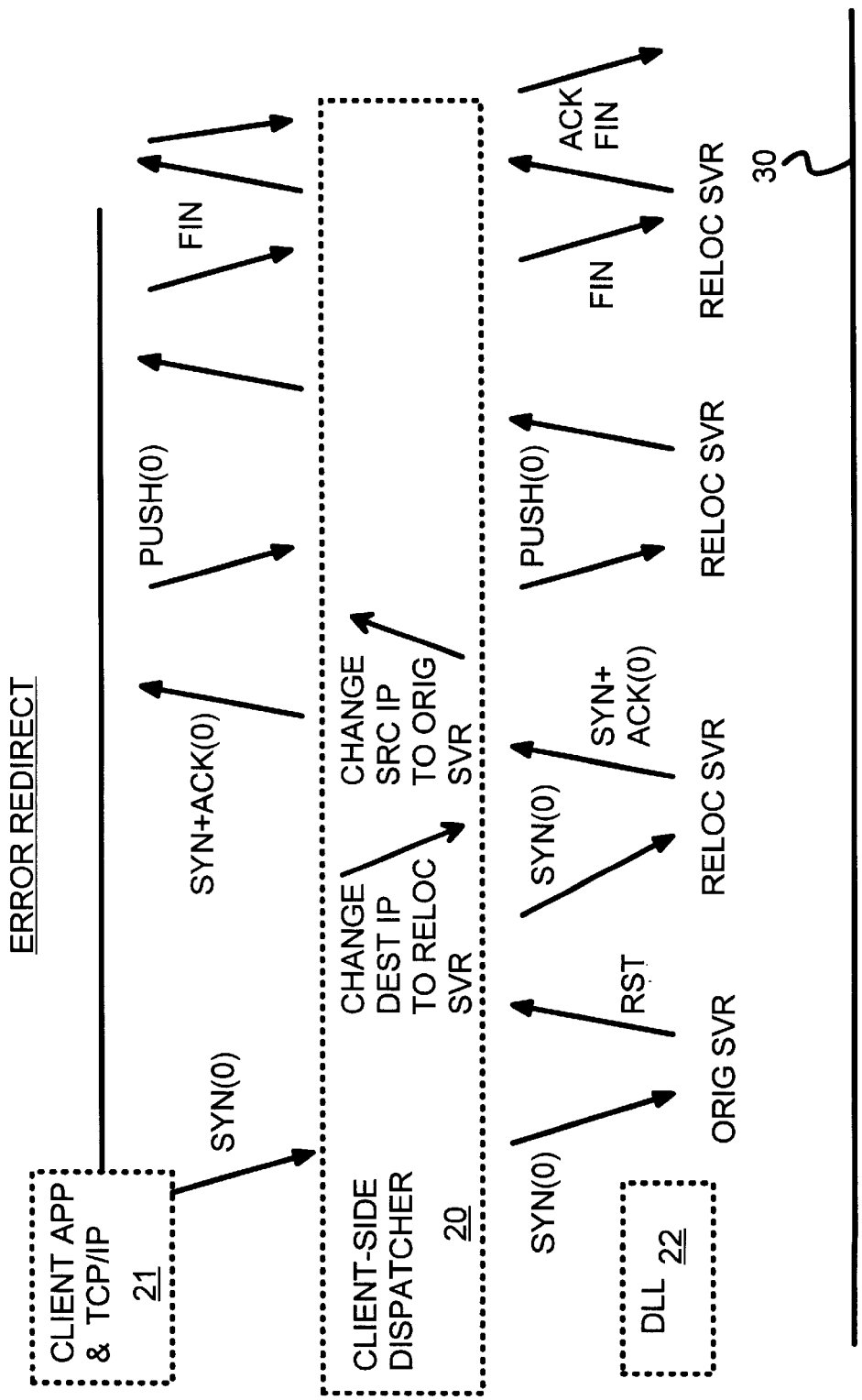
FIG. 5 shows an initial error packet intercepted by the client-side dispatcher and the connection migrated to a relocated server.

Initial-Effor/Timeout Redirect—FIG. 5

FIG. 5 shows an initial error packet intercepted by the client-side dispatcher and the connection migrated to a relocated server. The client-side dispatcher can operate in several modes. An error-recovery mode is described first. The error-recover mode allows packets to flow through freely from the high-level client application and TCP/IP layers 21 to the data-link layer DLL 22 and out over network 30 to a server. However, when an error packet is received from a server, client-side dispatcher 20 prevents the error packet from reaching the client application. Instead, a new connection to another server is opened using TCP state migration. The relocated server then responds to the client requests. Packets are altered by client-side dispatcher 20 to look like packets from the original server so that the high-level client application is not aware of the error or that the server connection has been relocated to another server.

When the high-level client application desires to open a new connection with a remote server, it causes the TCP layer to generate a SYN packet that is sent down the TCP/IP stack to network 30. Before reaching DLL 22, the SYN packet is intercepted by client-side dispatcher 20. A session entry in the session table is created for the new connection, but the packet is not altered and is passed down to DLL 22.

The remote server is the original server identified by the destination IP address and TCP port from client application and TCP/IP layers 21. When this original server operates normally, it responds with a SYN+ACK packet to the client. When client-side dispatcher 20 sees the SYN+ACK packet, it may delete the session entry and allow the session to proceed normally without altering any packets.

However, when the server process is not running, the server machine may respond with an error packet such as a reset RST packet. This RST packet is intercepted by client-side dispatcher 20 after being passed up by DLL 22. Rather than send this RST packet up to client application and TCP/IP layers 21, client-side dispatcher 20 intercepts the RST packet and performs TCP state migration to another server. A timeout could also occur rather than a RST packet being received. The timeout could then initiate state migration rather than the RST packet.

The SYN packet is retrieved from the local packet storage in client-side dispatcher 20, and the destination address is translated from the original server's address to an IP address of another server, the relocated server. The address is translated by looking up the original server's IP address and TCP port in the address translation table to find the IP address and TCP port of the relocated connection to the server process. The TCP and IP checksums are recalculated before the altered SYN packet is sent out over network 30 to the relocated server.

If the relocated server is also down, and either times out or replies with a RST packet, the relocation process can be repeated. However, when the relocated server responds with a SYN+ACK packet, the connection can be migrated. The source address of the relocated server is changed to the original server's address by client-side dispatcher 20, and the checksums recalculated. The altered SYN+ACK packet is passed up to the client TCP stack. The client application's TCP stack then sends its request in a TCP data packet. The request packet is intercepted by the client-side dispatcher, and it destination address changed from the original server to the relocated server. Checksums are recalculated and the altered request packet is sent over network 30 to the relocated server. The relocated server responds with one or more data packets that are intercepted by the client-side dispatcher. The source addresses of these data packets are changed to the original server's address before being passed up to the client application.

When the client has received all the desired data, it closes the connection by sending a finish FIN packet if the server process has not already closed. Again, client-side dispatcher 20 alters the destination address of outgoing packets to the relocated server, and the source address of incoming packets from the relocated server, as well as recalculate checksums. Thus the packets to the client application appear to be from the original server and not from the relocated server. A four-way handshake series of FIN and ACK packets are exchanged to close the connection. The client-side dispatcher then deletes the session entry from the session table.

Figure 6:
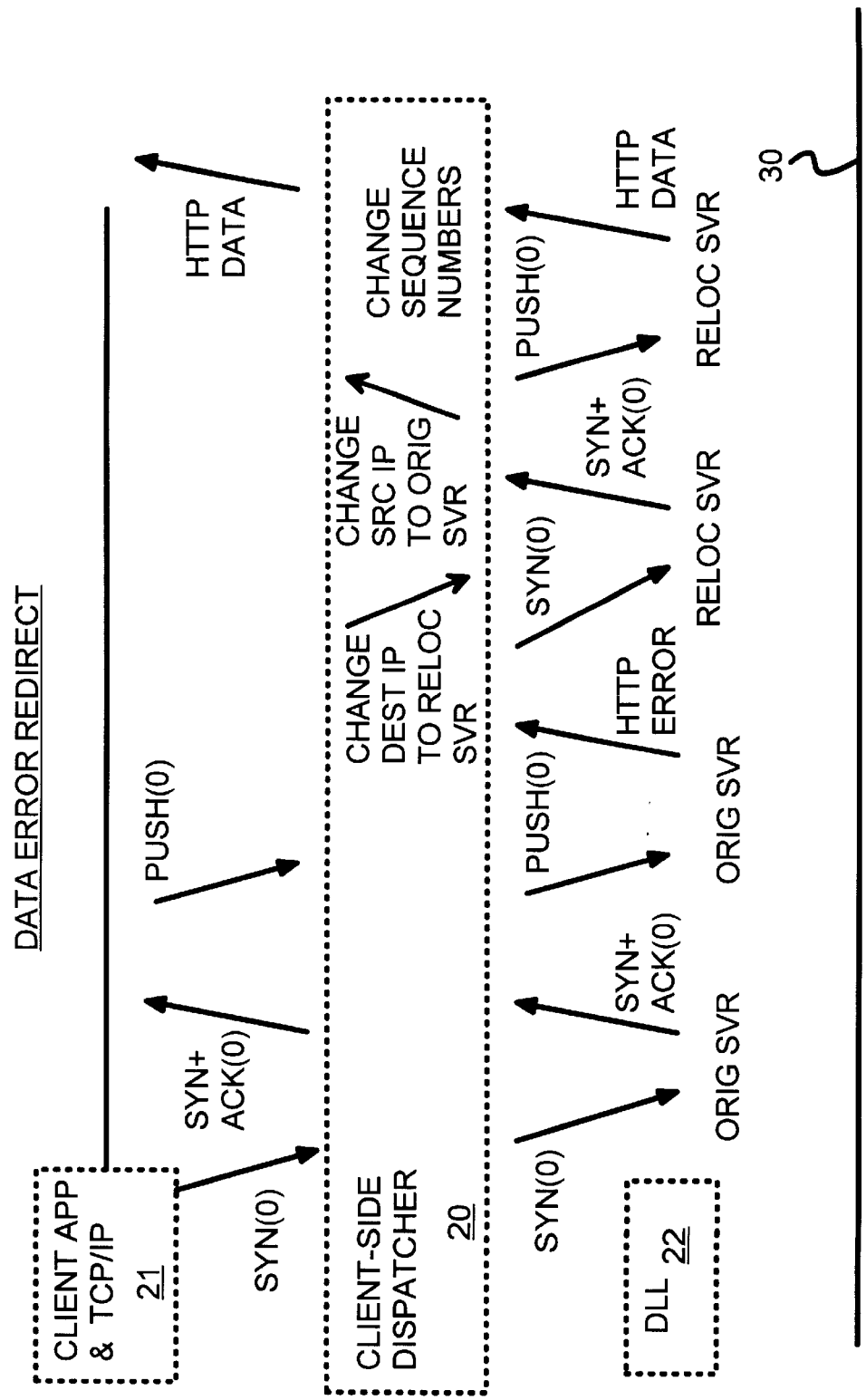
FIG. 6 illustrates client-side TCP state migration to a relocated server when a connection was made to an original server that later fails.

Data-Error Redirect—FIG. 6

The server may also fail after the connection has been made. The client-side dispatcher may also be configured to handle these late-stage errors. FIG. 6 illustrates client-side TCP state migration to a relocated server when a connection was made to an original server that later fails.

The client application and TCP/IP layers 21 generate an initial SYN packet that is stored by client-side dispatcher 20 but not altered. DLL 21 transmits the unaltered SYN packet over network 30 to an original server specified by client application and TCP/IP layers 21. The original server is functional and responds with a SYN+ACK packet that is passed up through DLL 21 and is not altered by client-side dispatcher 20. The connection has thus been successfully made with the original server.

The client application's TCP stack then requests the data by sending one or more request packets that contain the URL. These packets are stored by client-side dispatcher 20 but not altered, being sent out over network 30 to the original server.

When the original server responds with the data, the packets are sent through unaltered and the session continues normally. However, when the original server then responds with an error packet, TCP migration is performed by client-side dispatcher 20. An error packet could be a reset RST packet or an error message within a packet, such as "404 Not Found" when the original server does not have the data identified by the URL.

Error packets are intercepted by client-side dispatcher 20 and not sent up to client application and TCP/IP layers 21. Thus the error is hidden from the client application and even the TCP/IP layers. Client-side dispatcher 20 uses its address translation table or other configuration information to locate another server (the relocated server) to handle the requested URL. The stored packets are retrieved and their destination addresses changed to the IP address and TCP port of the relocated server. The initial SYN packet is first sent from client-side dispatcher 20 through DLL 22, over network 30 to the relocated server.

The relocated server responds with a SYN+ACK packet that is also intercepted by client-side dispatcher 20 and not passed up to the client application. The stored request packets with the URL are then retrieved and altered for the destination address of the relocated server, and sent over network 30 to the relocated server.

The relocated server responds to the altered request packets with the data, which is passed up to client application and TCP/IP layers 21 after having the source address and port altered to that of the original server. Thus the data appears to be coming from the original server rather than from the relocated server. The client's stack can close the connection by sending a FIN packet (not shown). These packets and reply packets from the relocated server are also altered in the same manner.

Sequence Numbers Changed by Stored Delta

Packets also contain TCP sequence numbers that allow the TCP/IP layers to sort the data into the proper sequence. This allows TCP packets to be transmitted or received in any order regardless of network delays. Each client and server machine TCP process starts with a randomly-generated sequence number and increments the sequence number for each new packet sent. Each packet contains two sequence numbers in the TCP header: one sequence number from the source machine, and another sequence number (an acknowledgement number) to acknowledge receipt of the last byte received from the destination machine. Sequence and acknowledgement numbers are generated and checked by the TCP layer. When an unexpected sequence number occurs, the packet is not accepted and an error occurs.

The sequence number from the client is not changed by state migration to the relocated server. However, the relocated server may use a different starting number as its sequence number than the original server did. Thus the sequence numbers from the original server may not match the sequence numbers from the relocated server. Client-side dispatcher 20 determines the difference in sequence numbers from the two servers and stores the difference in sequence numbers as a delta amount.

The delta amount is determined by comparing the sequence numbers of the first SYN+ACK packet from the original and relocated servers. The delta is calculated as the sequence number of the SYN+ACK packet from the relocated server, minus the sequence number of the SYN+ACK packet from the original server. This delta sequence amount is stored in the session table.

The sequence number of each incoming packet from the relocated server is adjusted by subtracting the delta amount from the relocated server's sequence number to get the equivalent sequence number that the original server would have generated. This equivalent sequence number is used, together with the original server's IP address and TCP port, when generating the checksums for the altered packets passed up to the client application and TCP/IP layers 21.

The last sequence number received from the server is incremented and copied into the next outgoing packet as the acknowledgement number by TCP/IP layers 21. The acknowledgement numbers of all outgoing packets to the relocated server must also be adjusted. The acknowledgement number of each outgoing packet to the relocated server is adjusted by adding the delta amount to the client-generated acknowledgement number to get the equivalent acknowledgement number that the relocated server expects.

Figure 7:
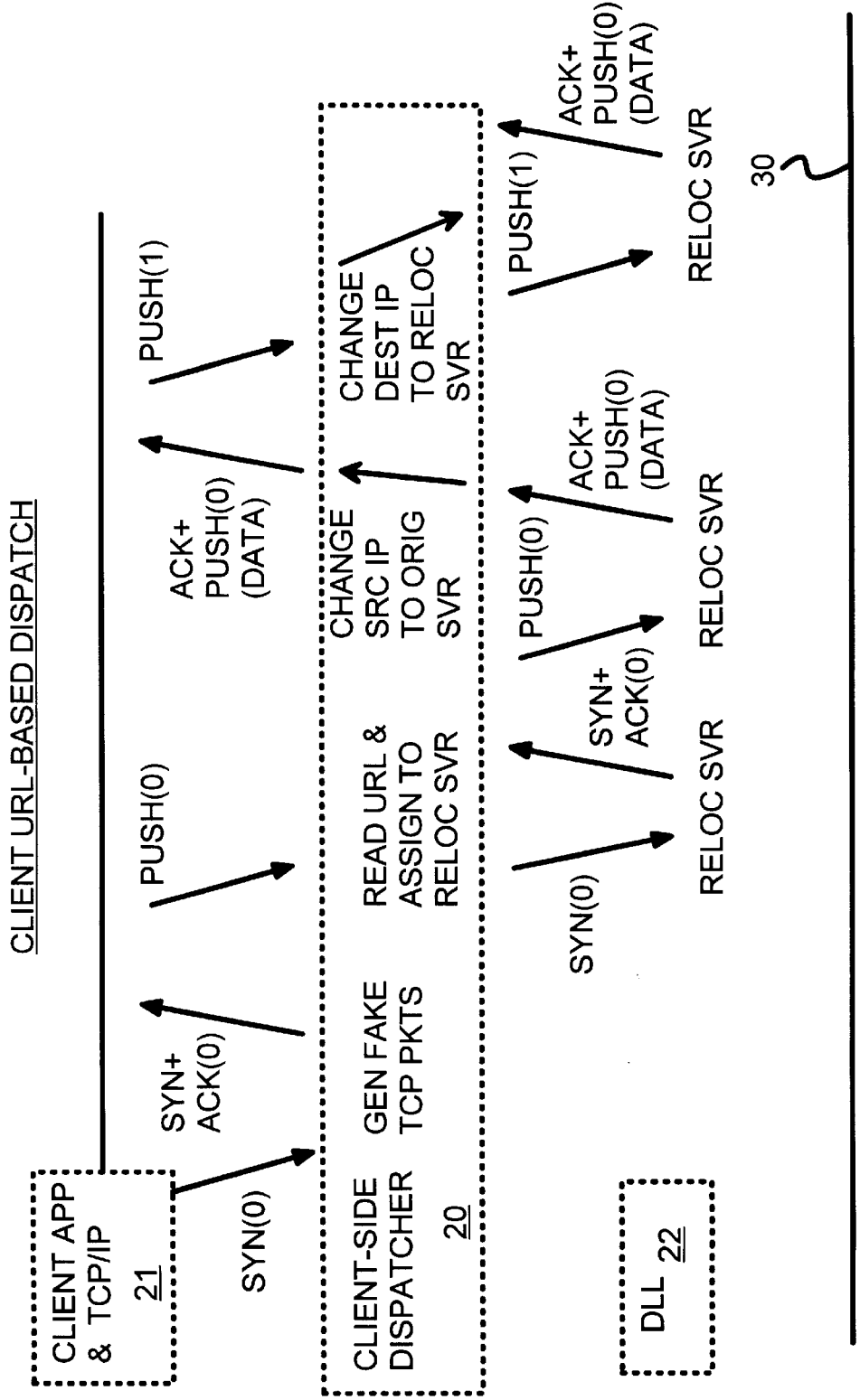
FIG. 7 highlights delayed URL-based dispatch from the client-side dispatcher to a server.

Client-Side URL-Based Dispatch—FIG. 7

The error-handling modes described for FIGS. 5, 6 transparently migrate the connection to another server so that the client application and TCP/IP layers do not see the error. A more sophisticated mode of the client-side dispatcher is to wait for the URL from the client application before making a connection with a remote server. Fake connection-acknowledgement packets are generated by the client-side dispatcher to the client application and TCP/IP layers. Once the URL is received in the subsequent packets from the client application, the client-side dispatcher decodes the URL and uses it to pick the assigned server, or communicates with a scheduling-policy server. The connection packets are then replayed and sent over the network to establish a connection with the assigned server and to get the data specified by the URL.

FIG. 7 highlights delayed URL-based dispatch from the client-side dispatcher to a server. Client application and TCP/IP layers 21 generate the SYN packet, which is intercepted and stored by client-side dispatcher 20. The SYN packet is not sent to DLL 22 or network 30. A faked TCP packet is instead generated by client-side dispatcher 20. This faked packet appears to be from the original server specified in the SYN packet, as it has the original server's IP address and port as the source address, and the client's IP address and port as the destination address. The SYN and ACK flags are set in the TCP header, and a random number is used as the first sequence number from the faked server. The acknowledgement number is generated by incrementing the SYN packet's sequence number (from the client).

The client's TCP module receives the faked SYN+ACK packet that was generated by client-side dispatcher 20, and replies with an acknowledgement packet followed by one or more request packets. Client-side dispatcher 20 also intercepts and stores these request packets, and decodes the URL contained within these packets. The URL is used to determine which server to send the request to (the relocated server). A load-balancer could supply configuration information to client-side dispatcher 20 that specifies a list of servers for certain URL's. URL's that are not configured for by client-side dispatcher 20 could be looked up by sending a request to a dispatching server such as load-balancer 70 of FIG. 1, or could simply be sent to the address specified for the original server. Client-side dispatcher 20 then makes a connection with the relocated connection and server chosen by decoding the URL in the request packets from the client application and TCP/IP layers 21. The stored SYN packet is altered to use the relocated server's IP address and TCP port, and the checksums regenerated. The altered SYN packet is sent to DLL 22 and over network 30 to the relocated server. This is the first packet transmitted over network 30, even though client application and TCP/IP layers 21 have already established a connection.

The relocated server responds with the SYN+ACK packet, which is also intercepted by client-side dispatcher 20 and not passed up to client application and TCP/IP layers 21. The request packets are retrieved from storage and altered to use the destination address of the relocated server. The acknowledgement number is also altered by the delta amount, and the checksums regenerated. At this point the connection has been transferred from local client-side dispatcher 20 to the remote relocated server.

The relocated server responds to the altered PUSH packet with one or more data packets, which are also intercepted by client-side dispatcher 20 and altered. The source address and port are changed to those for the original server, and the sequence number from the relocated server changed by subtracting the delta amount. The delta amount is generated as the sequence number from the relocated server for the SYN+ACK packet, minus the sequence number randomly generated by client-side dispatcher 20 for the initial SYN+ACK packet.

The altered SYN packet is the first packet actually transmitted over network 30. The client application actually established a local connection with client-side dispatcher 20 on the client machine, rather than a remote connection over network 30. The remote socket (connection endpoint) was migrated from the client-side dispatcher in the local client machine to the remote server machine.

Figure 8:
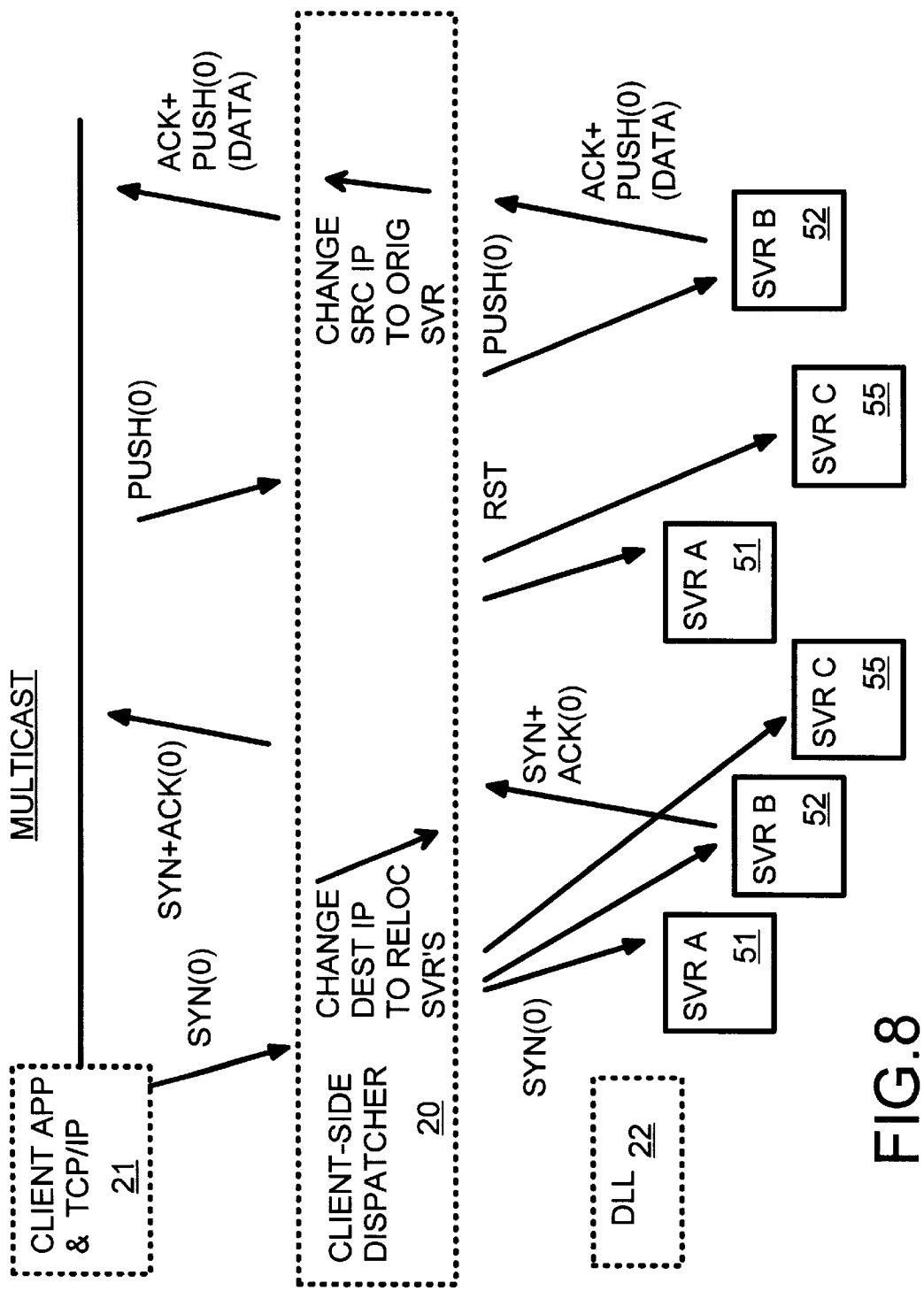
FIG. 8 highlights multicast from the client-side dispatcher to multiple servers to find the fastest-responding server to handle the request.

Client MultiCast for Load-Balancing—FIG. 8

FIG. 8 highlights multicast from the client-side dispatcher to multiple servers to find the fastest-responding server to handle the request. The invention can also be used in a mode that performs an empirical load-balancing. Connection packets are sent to multiple servers. The first server to respond is likely the server with the lightest load, highest performance, or closest on the network. Thus the first server to respond is often the best choice and would be picked by a rule-based load-balancer. Indeed, such empirical load-balancing may be more efficient than traditional rule-based load balancing since a traditional load balancer's load information is slightly stale due to the latency for load queries.

The client can triangulate (measure the round trip time, or "latency") to the intended servers and choose the fastest responding server. This has the effect of minimizing the wide-area network (WAN) and can thus be called WAN minimization. Prior-art techniques would triangulate to the DNS server rather than to the intended servers.

When client application and TCP/IP layers 21 generate the first SYN packet, client-side dispatcher 20 stores the packet and makes an entry in the session table. Multiple servers are chosen as candidates to process the request by using the address translation table or configuration information. Multiple copies of the SYN packet are generated, and the destination IP address and TCP ports changed in each packet to a different server.

These multiple SYN packets are then sent to the network through DLL 22 to the different servers 51, 52, 55. Some servers have a lighter loading than others and thus can respond more quickly than other servers. The servers may be located at different geographic sites, such as for large corporate server sites that have servers in several different cities or even different countries. Even servers in the same city may be located at different nodes on the network, and thus their SYN packets travel through different routers, switches, etc. Thus the delay for the SYN packet to reach each server, and for the reply to return to the client machine, vary from server to server.

In the example of FIG. 8, server 52 is the first to respond with a SYN+ACK packet. Connections to the other servers 51, 55 are closed by client-side dispatcher 20 which transmits reset RST packets to them.

The SYN+ACK packet is altered by changing the source address to the original server's source address, and regenerating the checksums. Client application and TCP/IP layers 21 responds to the connection being established by sending the URL in a request packet. This packet is intercepted by client-side dispatcher 20 and the destination address changed to address of the relocated server 52. The altered packet is transmitted to server 52, which responds with the data. Data packets are also altered before being sent up to client application and TCP/IP layers 21. The connection with the chosen server 52 is closed in the normal manner with FIN packets (not shown).

Address-Translation Table

Another mode of the client-side dispatcher simply translates every packet using the address translation table. The destination address for the first SYN packet is looked up in the address translation table and replaced with the address of the replaced server if a match is found. An entry in the session table is created when a match is found.

The address translation table is simply a table looked up by the IP address and TCP port of the original server specified by the client application and TCP/IP layers. Each entry in the table includes the original server's IP address and port and the relocated server's IP address and port.

Figure 9:
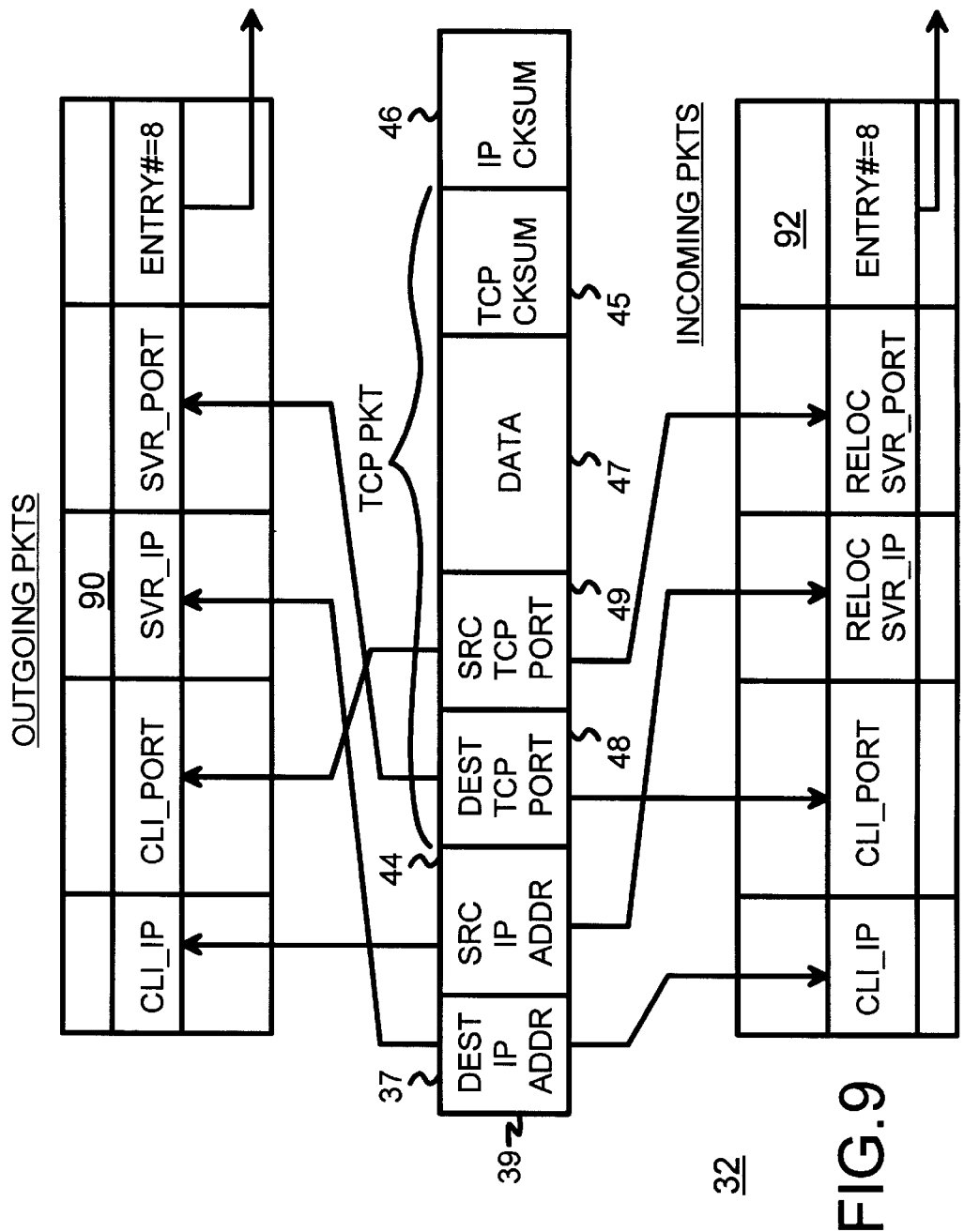
FIG. 9 shows an index into the session table for outgoing packets and another index into the session table for incoming packets.

Session Table Index—FIG. 9

FIG. 9 shows an index into the session table for outgoing packets and another index into the session table for incomning packets. The session table is a hash table with exactly one entry for each open or active TCP session from the client. When multicasting, one entry is used for each attempted TCP session with a remote server. The entries for the losing servers are deleted once the first server responds.

An entry is found in session table 32 by using one of two indexes or look-up mechanisms. Outgoing packets generated by the client's TCP layer use outgoing index 90, while incoming packets from the network use incoming index 92.

When packet 39 is an outgoing packet generated by the client application and TCP/IP layers, outgoing index 90 is accessed by comparing IP addresses and ports for both the source (client) and destination (server). Destination IP address field 37 and destination TCP port field 48 form the server address that is compared to the SVR_IP and SVR_PORT fields in outgoing index 90. Source IP address field 44 and source TCP port field 49 form the client address that is compared to the CLI_IP and CLI_PORT fields in outgoing index 90. When all four fields match, the entry for the server has been found, and an entry field is read out of index 90. In this example, index 90 points to entry 8 in the session table of FIG. 10.

When packet 39 is an incoming packet generated by the server, incoming index 92 is accessed by comparing IP addresses and ports for both the source (server) and destination (client). Destination IP address field 37 and destination TCP port field 48 form the client address that is compared to the CLI_IP and CLI_PORT fields in incoming index 92. Source IP address field 44 and source TCP port field 49 form the server address that is compared to the RELOC_SVR_IP and RELOC_SVR_PORT fields in incoming index 92. When all four fields match, the entry for the server has been found, and an entry field is read out of index 92. In this example, incoming index 92 also points to entry 8 in the session table of FIG. 10.

Outgoing index 90 contains IP addresses and ports for the original server since outgoing packets from client application and TCP/IP layers 21 use the original server's address. Incoming index 92 contains IP addresses and ports for the relocated server since incoming packets from the relocated server use the relocated server's address, not the original server's address. Thus using two indexes allows a single session-table entry to be used for both incoming and outgoing packets. One index uses the original server's address, while the other index uses the relocated server's address.

The client address is also included in indexes 90, 92. Although the client's IP address does not normally change, different TCP ports are used for the different client applications. The server address is for a process on the server, distinguished from other server processes by the server TCP port.

Packet 39 also contains data field 47, which can contain HTTP messages such as errors as well as data. The TCP packet is embedded within the IP packet 39. TCP port fields 48, 49, data field 47, and TCP checksum 45 form the TCP header. The sequence and acknowledgement numbers are also contained in the TCP header. IP checksum 46 is the checksum for the IP header.

Figure 10:
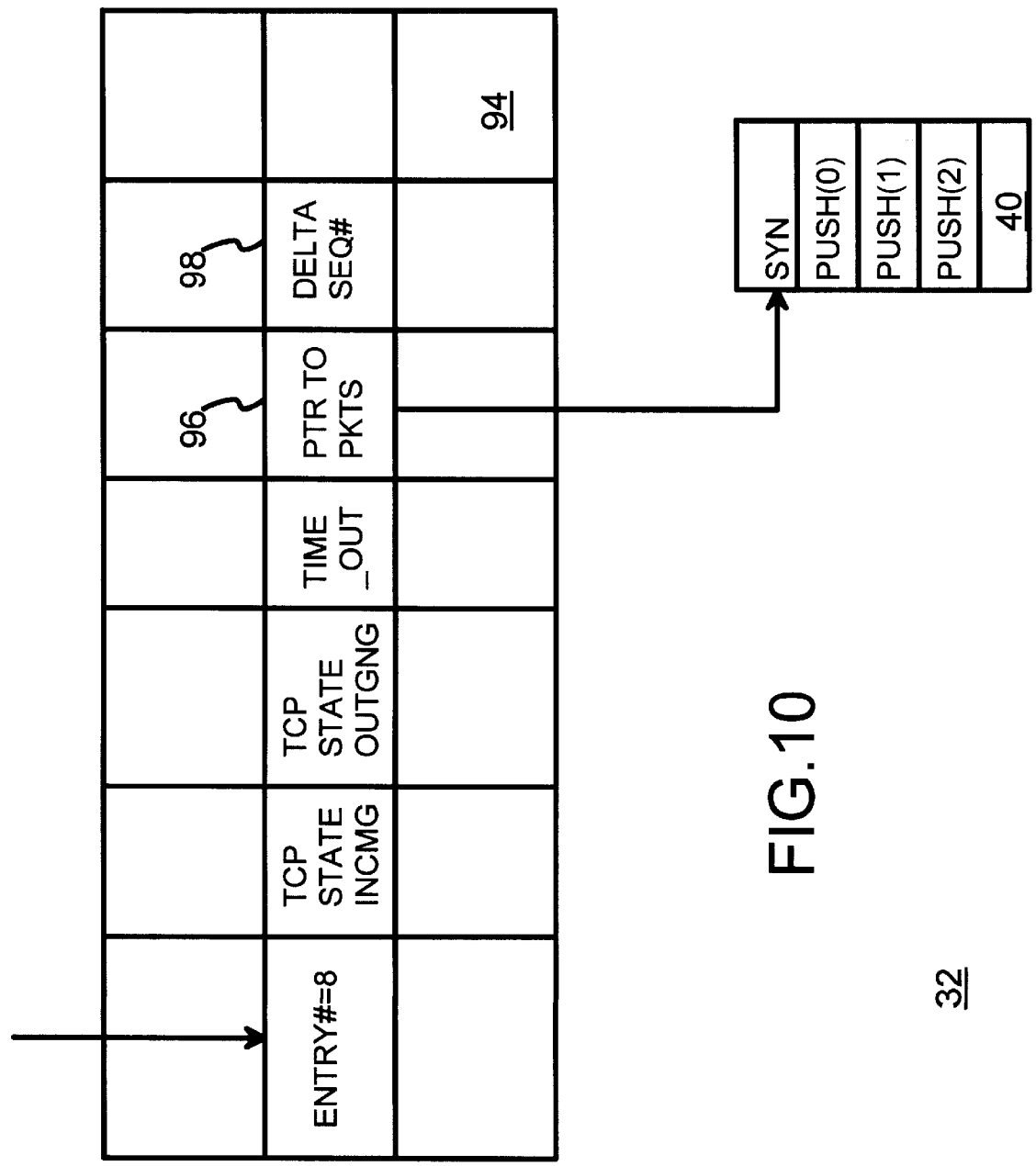
FIG. 10 shows the contents of the session table in the client-side dispatcher.

Session Table Contents—FIG. 10

FIG. 10 shows the contents of the session table in the client-side dispatcher. Session table 32 includes the indexes of FIG. 9 that point to session contents 94. Each entry in the session table is identified by an entry number that matches one entry in each index. Entry #8 is shown.

The TCP state machine keeps track of the TCP state and handshake progress. The TCP state changes as packets such as SYN, ACK, and FIN are sent or received. Since the client-side dispatcher may not pass through all packets, or may generate multiple packets for TCP state migration, the TCP state seen by client application and TCP/IP layers 21 may not be the same as the TCP state seen over the network by the server. Thus two TCP states are stored in session table 32. The TCP state for incoming packets (seen by the network and relocated server) is stored as TCP_STATE_OUTGNG, while the TCP state for outgoing packets (seen by the client application and client's TCP/IP layers) is stored as TCP_STATE_INCMG.

Timeout field TIME_OUT keeps a timestamp of when the last packet was sent over the network. Software can periodically check this field to determine when the connection has timed out. When a connection times out, error recovery such as shown in FIGS. 5 and 6 can be used to relocate to another server, or to retry the timed out server. Individual packets may be retransmitted when the timeout occurs to attempt recovery.

The client-side dispatcher stores outgoing packets for later re-transmission to a relocated server should an error occur, or for delayed URL-based dispatching. Since these packets vary in size, the packets are stored in a separate area of memory, local packet storage 40. Pointer 96 in session table 32 points to packets in local packet storage 40 for the entry. Pointer 96 may point to the first packet stored, the initial SYN packet, or to the most-recently-sent packet.

Delta field 98 contains the delta sequence amount, the difference in sequence numbers from the relocated server compared to the original server. The delta amount is added or subtracted from the sequence numbers for adjustment to account for TCP migration.

Scheduling-Policy Server Queried by Client-Side Dispatcher

In one embodiment, the client-side dispatcher can operate with a cooperating server known as a scheduling-policy server. The scheduling-policy server can be located either at the server farm or near the client. The scheduling-policy server contains information on servers at one or more particular locations. The client-side dispatcher sends the URL to the scheduling-policy server and indicates that it is a client-side dispatcher. The scheduling-policy server reads the URL and responds with a list of server that can respond to the requested URL.

The client-side dispatcher then selects one of the servers on the list received from the scheduling-policy server, perhaps using a selection method indicated by the scheduling-policy server in its response. Multicasting can be used by the client to all servers on the list.

The client-side dispatcher can be configured to point to the scheduling-policy server, or it can locate the scheduling-policy server using a standard DNS server. The scheduling-policy server can include a time-to-live (ITL) value in its response to instruct the client-side dispacher about the permissible length of time that the server list can be cached by the client.

Configuration of Client-Side Dispatcher

In another embodiment the client-side dispatcher is configured with translations to relocated servers and with URLs when URL-based dispatch is enabled. While the client-side dispatcher cannot be configured with addresses for every possible web site, addresses for commonly-accessed web sites can be sent in a configuration file. The client-side dispatcher has particular usefulness in the corporate setting, such as for corporate Intranets or Extranets. Users within the company can be sent configuration files containing addresses of corporate servers and servers for suppliers and customer web sites. This allows corporate MIS departments to balance loads within their networks by assigning different users to different servers as their primary relocated server. When a server goes down for maintenance, the MIS department can reconfigure the client-side dispatchers to translate to a different relocated server, such as a backup server.

Other Configuration Options

While a configuration file with the configuration table may be sent to every client machine, other mechanisms are contemplated by the inventor. In a passive network configuration, a central server contains the configuration information for all clients within the organization. When changes are made, the central server contacts each client to update its configuration table. In an active network configuration, each client-side dispatcher has a file of central servers with the configuration information. Each client-side dispatcher updates its own configuration information by contacting the central server, perhaps at client boot-up.

Some servers may be loaded with special dispatch software so that they cooperate with the client-side dispatcher. When the client-side dispatcher contacts such a cooperating server, the server sends configuration information to the client-side dispatcher with the relocated addresses. The cooperating server could identify the client-side dispatcher by having a list of clients with the client-side dispatcher installed, or a special combination of flags could be set in the packets. The cooperating server could instruct the client-side dispatcher to relocate to a different server by sending a special message back that is intercepted by the client-side dispatcher.

ADVANTAGES OF THE INVENTION

A client-level, high-availability system is provided by the client-side dispatcher. A crash of the server farm's load-balancer does not affect existing connections, providing higher availability. The client can relocated to a new server should the server crash. When the client has a list of possible servers, it can relocate even when server farm's load-balancer has crashed.

Multicast load-balancing might at first appear to increase network traffic, since multiple requests are sent to multiple servers, even though only one server is needed for the request. However, only the initial SYN packet is sent to multiple servers. This SYN packet is small since it does not even contain the URL, nor does it contain web-page data. Thus the additional traffic caused by multicast of the initial SYN packet is minimal. Since the first server to respond is often the closest geographically, or the one on the least-busy part of the Internet, traffic can actually be reduced since a closer server is chosen. Network bottlenecks are avoided since slow connections are not chosen. The invention automatically picks a server that avoids these network bottlenecks that slow the response to the SYN packet. Thus the invention can spread out Internet traffic to use less-crowded routes. The client can triangulate to the intended servers and choose the closest. Prior-art techniques would triangulate to the DNS server rather than to the intended server.

The invention provides highly fault-tolerant web browsing. Error recovery using client-side TCP migration greatly reduces the probability that a user gets the "SERVER NOT RESPONDING" error message when a server fails at the web site. If the primary load-balancer at the server farm crashes or otherwise becomes unavailable, the client with the client-side dispatcher does not hang since client packets are not forwarded through the load-balancer. The invention avoids a client hang caused by a load-balancer crash.

The standard TCP/IP layers are used by the client and server, and the high-level client and server applications are not modified. The invention migrates to another server transparently to the high-level client applications. This is an advantage since standard software is used as much as possible. The server's application layer runs the standard httpd server software. Modified server software is not needed. Having the load balancer below the TCP/IP layers simplifies node management and allows code tweaks to occur with minimal interruption.

ALTERNATE EMBODIMENTS

Several other embodiments are contemplated by the inventor. For example various local networks may be used, including those which use token-ring or other NIC addresses rather than MAC address as the local or physical network address. Switches, hubs, and hardware or software-based routers can be inserted for larger networks.

Each server can process requests from multiple clients, and multiple requests can be sent from the same client machine, especially when multitasking operating systems such as UNIX and Windows NT are used. While a connection through the public Internet has been described, the connection could also be made through private networks such as corporate networks known as intranets. Intranets are just a subset of the larger Internet. Thus the web site could be behind a corporate firewall and not be visible to the users of the Internet.

The web-server site may be a "web-hoster" containing many web sites for different companies rather than a single web site. To support a variety of different sites the client-side dispatcher may accept multiple virtual IP addresses as destinations for support of "multi-homed" servers. Heterogeneous clusters could contain different types of servers with each server running different operating systems (OS's) such as Windows/NT, SOLARIS, HPUX, AIX, etc.

Servers in the web farm may be geographically remote, where some of the servers are located in one city while other servers are located in other cities. Load balancing may be performed not just based on URL (content), but also geographically to minimize traffic on the network backbone. The parts of the web site in a city may be connected locally through one or more LAN's, while being connected to other cities using a WAN. The IXP or UDP protocols can be used for all packets rather than just TCP as described. Audio and video streaming commonly use TCP to make the initial connection followed by a stream of UDP packets rather than TCP, so the invention can migrate states for these applications.

The invention has been described as a browser accessing a file or web page on the server, but the file may actually be a resource that is not necessarily a traditional file. The file may be a program, applet, or script which is executed, or an interface into an SQL database or to fast or memory-intensive computational resource. Web servers support application-Programming Interfaces (API's) which enable servers to be compiled with unique capabilities for alternate types of server resources.

Since these resources are expensive to implement on all servers, it is desired to allocate just one or a few servers to handling requests for these resources. The invention waits to perform load-balancing and assign a server until after the URL has been parsed. Thus the invention is ideal for assigning specialty servers having these resources. The web site can be segregated by resource and still be load-balanced by the clients.

The invention may also be applied to other Internet traffic as well. The invention could be applied to a File-Transfer-Protocol (FTP) server, a post-office-protocol (POP3) server, a rlogin server, or a telnet server, either as a stand-alone site or as a part of a larger web site.

While delayed resource binding is preferred, other embodiments are contemplated. HTTP redirection from the client-side dispatcher to the relocated server may be used after the URL has been parsed. The client-side dispatcher may relocate to a virtual address of a server-side load-balancer such as described in the parent application.

The client-side dispatcher may reside on a machine other than the client. For example, the client-side dispatcher could reside on an intermediate node such as a gateway or router through which all clients are routed. Often all client traffic to the outside Internet is routed through such a gateway that could be loaded with the client-side dispatcher. Administration and configuration is then simplified since only one copy of the client-side dispatcher on the gateway needs to be maintained and configured rather than many copies on many client machines.

The invention can be modified to be embedded in a NIC (Network Interface Card such as an Ethernet card). In this embodiment, the invention is completely transparent to the native operating system. The invention then contains some functions normally associated with the IP stack, notably fragmentation and defragmentation.

The URL passed to web server can also be modified to reference relocated web pages without changing the links. The modes of dispatch may be combined. For example, error recovery can be used with URL-based dispatch or multicast.

The client-side dispatcher could re-assign a request to another relocated server when an error occurs, or by decoding the new URL and re-assigning the client application to another server. FIN packets are used to close one server, while the connection is migrated to the new server by replaying the SYN packet and the PUSH packet with the new URL.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A client-side dispatcher for migrating a connection for a high-level client application from an original server to a relocated server, the client-side dispatcher comprising:

a session table for storing an original server address of the original server and a relocated server address of the relocated server;

an input for receiving first packets from the high-level client application, the first packets having the original server address as a destination address;

an output for outputting to a network second packets, the second packets having the relocated server address as the destination address;

a local packet storage for storing the first packets;

an address translator for converting the destination address of the first packets from the original server address to the relocated server address to generate the second packets;

a packet replayer for sending the second packets to the output;

a first state machine for tracking a sequence of the first packets from the high-level client application;

a second state machine for tracking a sequence of the second packets to the network;

a checksum generator for re-generating a checksum for the second packets containing the relocated server address; and a sequence-number generator for adjusting a sequence number of incoming packets from the relocated server to match sequence numbers from the original server, and for adjusting an acknowledgement sequence number of outgoing packets to the relocated server to match sequence numbers for the relocated server, whereby packets to the original server are altered for transmission to the relocated server.

2. The client-side dispatcher of claim 1 wherein the input is connected to an Internet-Protocol IP layer, the IP layer connected to a transfer-control-protocol TCP layer that is connected to the high-level client application, while the output is connected to a data-link layer, the data-link layer connected to the network.

3. The client-side dispatcher of claim 1 wherein the session table comprises a plurality of entries, each entry being selected by a first index and by a second index, the first index comprising the original server address while the second index comprising the relocated server address, wherein the first index is extracted from outgoing first packets while the second index is extracted from incoming packets from the relocated server.

4. The client-side dispatcher of claim 3 wherein the sequence numbers of incoming packets from the relocated server are adjusted by subtracting a delta value while the acknowledgement sequence numbers for outgoing packets to the relocated server are adjusted by adding the delta value.

5. The client-side dispatcher of claim 4 wherein the delta value is generated by subtracting a sequence number from a first packet received from the relocated server from a sequence number from a first packet received from the original server.

6. The client-side dispatcher of claim 4 wherein each entry in the session table comprises:

a first TCP state for a connection between the high-level client application and the client-side dispatcher;

a second TCP state for a connection between the client-side dispatcher and the relocated server;

a time stamp field for storing a time of a last packet;

a pointer to packets for the connection stored in the local packet storage; the delta value.

7. The client-side dispatcher of claim 1 wherein the input is connected to a data-link layer and the output is connected to an IP layer, the address translator being located on a network-interface card below a TCP/IP stack.

8. The client-side dispatcher of claim 1 further comprising:

an error detector for detecting an error from the original server, the error detector sending a reset packet to the original server to close a connection, the error detector activating the address translator to translate the first packets stored in the local packet storage into the second packets;

wherein the packet replayer sends the second packets to the relocated server to make a new connection with the relocated server instead of with the original server, whereby the connection is migrated from the original server to the relocated server when an error occurs.

9. The client-side dispatcher of claim 8 wherein the error detector detects the error when the original server does not respond or when incoming data indicates an error.

10. The client-side dispatcher of claim 1 wherein the session table is configured by a configuration file, by a remote policy server, or by a local server.

11. The client-side dispatcher of claim 1 wherein the original server is a faked server within the client-side dispatcher, the client-side dispatcher generating faked acknowledgement packets having an address of the faked server as a source address, the client-side dispatcher sending the faked acknowledgement packets to the high-level client application to make a connection between the faked server and the high-level client application;

and further comprising:

a universal-resource-locator URL means for extracting a URL from a second packet from the high-level client application sent after the connection with the faked server is made, the URL used by the address translator to generate the relocated server address;

a connection migrator for activating the packet replayer to send the second packets over the network to make a new connection with the relocated server;

wherein packets are not sent over the network when the connection with the faked server of the client-side dispatcher is initially made until the connection is migrated to the relocated server after the second packet with the URL is received.

12. The client-side dispatcher of claim 1 further comprising:

multicast means for sending multiple connection-establish packets to multiple servers over the network in response to an initial first packet from the high-level client application;

the client-side dispatcher making a connection with a first server in the multiple servers that sends a response packet, the first server having its response packet received by the client-side dispatcher before response packets from any others of the multiple servers are received;

reset means for sending a reset packet to each of the others of the multiple servers to end connections with all the multiple servers except the first server, whereby the client-side dispatcher performs load balancing by empirically selecting the first server to respond to a multicast of connection-establish packets sent to the multiple servers.

13. A computer-implemented method of servicing requests for resources from a client application by nodes containing different resources, the computer-implemented method comprising the steps of:

making a connection and setting up a session between the client application and an original server specified by the client application;

waiting for a URL request from the client application once the original server has made the connection with the client application;

intercepting the URL request from the client application and decoding the URL request to determine a requested resource;

comparing an identifier for the requested resource to identifiers for resources located on a plurality of nodes and determining a first subset of the plurality of nodes which contain the requested resource and a second subset of the plurality of nodes which do not contain the requested resource;

assigning the URL request to an assigned node in the first subset of the nodes which contain the requested resource, wherein the assigned node is not in the second subset;

transferring the connection and the session setup from the original server to the assigned node containing the requested resource;

reading the requested resource on the assigned node and transmitting the requested resource to the client application, whereby the assigned node is selected based on a location of the requested resource determined from the URL request.

14. The computer-implemented method of claim 13 wherein the step of transferring the connection and the session setup to the assigned node containing the requested resource comprises:

storing packets received from the client application when establishing the connection;

transmitting the packets to the assigned node after the URL request is received, whereby the connection is transferred from the original server to the assigned node by re-transmitting the packets to the assigned node.

15. The computer-implemented method of claim 13 wherein the original server is a faked server process within a client-side dispatcher on a client machine, the connection being initially made within the client machine without sending packets over a network.

16. A computer-program product comprising:

a computer-usable medium having computer-readable program code means embodied therein for dispatching packets by a client, the computer-readable program code means in the computer-program product comprising:

network connection means for transmitting and receiving packets from a remote server;

a client application;

a TCP layer receiving requests from the client application, for generating TCP packets including a SYN packet for initiating a connection with a server and a PUSH packet for sending a URL to the server;

an IP layer receiving the TCP packets from the TCP layer, for generating IP packets;

a client-side dispatcher, receiving the IP packets from the IP layer and sending packets to the network connection means, for altering packets to send to a different destination server.

17. The computer-program product of claim 16 wherein the computer-readable program code means further comprises:

multicast means, in the client-side dispatcher, for generating multiple copies of the SYN packet and altering a destination address in each SYN packet to point to a different one of multiple servers;

first response means, in the client-side dispatcher, for sending the PUSH packet to acknowledge a connection with a first server to send a response packet back, the first server being one of the multiple servers;

reset means, in the client-side dispatcher, for sending reset packets to all the multiple servers except the first server, wherein the PUSH packet is sent only to the second server but the SYN packet is sent to the multiple servers, whereby the first server is assigned by the client-side dispatcher by multicast dispatch to the multiple servers to find the first server to respond.

18. The computer-program product of claim 16 wherein the computer-readable program code means further comprises:

a local packet storage for storing the SYN and PUSH packets;

error means for detecting an error from an original server connected to the client application;

altering means for changing a destination address in the SYN and PUSH packets to a relocated address of a relocated server to generate altered SYN and PUSH packets;

replay means for sending the altered SYN and PUSH packets to the relocated server using the network connection means;

intercept means for blocking an acknowledgement packet from the relocated server and not sending the acknowledgement packet to the client application;

the altering means also changing a source address of data packets from the relocated server to an address of an original server specified by the client application, whereby the client-side dispatcher migrates the connection to the relocated server when the error is detected.

19. The computer-program product of claim 18 wherein the error occurs when the SYN packet is sent to the original server or when the PUSH packet is sent to the original server.

20. The computer-program product of claim 16 wherein the computer-readable program code means further comprises:

a universal-resource-locator URL means for extracting a URL from a packet from the client application, the URL indicating a requested resource;

server selection means, coupled to the URL means, for selecting possible destination server from multiple servers, the possible destination servers each having the requested resource; and policy server means, coupled to the server selection means, for configuring the server selection means with rules for selecting one of the possible destination server as a destination server, whereby the destination server is selected from the possible destination servers.

\* \* \* \* \*